United States Patent [19]
Estes

[11] Patent Number: 4,764,826
[45] Date of Patent: Aug. 16, 1988

[54] TAPE CASSETTE AND COOPERATING APPARATUS

[75] Inventor: Marvin F. Estes, Oakfield, N.Y.

[73] Assignee: Eastman Kodak Company, Rochester, N.Y.

[21] Appl. No.: 809,700

[22] Filed: Dec. 17, 1985

[51] Int. Cl.⁴ .................. G11B 5/008; G11B 15/00; G11B 17/00
[52] U.S. Cl. ..................... 360/93; 360/132; 360/137
[58] Field of Search .............. 360/132, 93, 90, 87, 360/100, 136, 137; 242/55.19 R, 197-201

[56] References Cited

U.S. PATENT DOCUMENTS

| | | | |
|---|---|---|---|
| 2,908,769 | 10/1959 | Fonda | 242/55.19 |
| 3,042,331 | 7/1962 | Bierman | 242/194 |
| 3,189,289 | 6/1965 | Maxey | 242/193 |
| 3,430,879 | 3/1969 | Boyer | 242/55.12 |
| 3,495,047 | 2/1970 | Muneo et al. | 179/100.2 |
| 3,571,500 | 3/1971 | Nassimbene | 178/6.6 |
| 3,677,494 | 7/1972 | Protas | 242/194 |
| 4,321,634 | 3/1982 | Lehureau | 360/70 |
| 4,321,637 | 3/1982 | Yamashita et al. | 360/93 |
| 4,388,659 | 6/1983 | Lemke | 360/90 |
| 4,692,822 | 9/1987 | Kabacinski | 360/84 |

FOREIGN PATENT DOCUMENTS 0654956 3/1979 U.S.S.R. .................. 360/90

OTHER PUBLICATIONS

Barnard et al., "Tape Scanning Device", IBM TDB, May 1962, vol. 4, No. 12, 40.

Primary Examiner—John H. Wolff
Assistant Examiner—David J. Severin
Attorney, Agent, or Firm—William C. Dixon

[57] ABSTRACT

A tape cassette that includes a rotatable drum having a centrally disposed tape storage device and a surrounding circumferential wall with one or more openings therein through which tape passes from the storage device to and helically around the outer surface of the wall and then back inside the drum. A cooperating recorder/reader head is mounted outside the drum in alignment with the tape to record/read a slant track thereon as the drum rotates. The tape storage device may be indexable to to incrementally advance the tape along the wall surface, or the head may be indexable so as to incrementally move across the tape, each time the drum completes one revolution, to thereby record/read a succession of slant tracks as the drum rotates through successive revolutions. Such a cassette offers the combined advantages of a fast-access disk and a mass-storage tape.

40 Claims, 8 Drawing Sheets

TAPE CASSETTE AND COOPERATING APPARATUS

BACKGROUND OF THE INVENTION

1. Field of the Invention

The present invention relates generally to a system for recording, storing, and reading information signals on a record medium, and particularly to such a system that provides both high storage capacity and fast access time.

2. Description of the Prior Art

The prior art is replete with information recording and reading devices that provide either a large information storage capacity with relatively slow access time, as in many tape recorders commonly available today, or relatively small storage capacity with fast access time, as in various magnetic and optical disk recorders now on the market. But the prior art has left wanting a simple, compact system that is capable of providing high storage capacity with fast access.

U.S. Pat. No. 4,388,659 is exemplary of tape recording apparatus offering flexibility in use as both a tape recorder and a tape playback device. Disclosed is apparatus capable of recording information on tape and playing back selected portions thereof as recording continues. In that apparatus, tape extends from a supply reel rotatably mounted inside a drum to a tape-up reel rotatably mounted outside the drum, at the distal end of a rotatable arm which projects radially outward from the drum axis. A recording head is mounted inside the drum, and a playback head is mounted on the arm. Rotation of the arm relative to the drum causes tape between the two reels to be wound upon or unwound from the peripheral wall of the drum, thereby permitting access to and playback of a selected portion of the tape as recording proceeds unabated. While such capability is useful in some applications, the apparatus there described still does not meet the aforementioned need for a compact system combining high storage capacity with fast access.

SUMMARY OF THE INVENTION

Accordingly, an object of the present invention is to provide a simple, compact, reliable system for recording, storing, and reading information signals on a record medium that combines the needed attributes of high storage capacity and fast access time. An ancillary object of this invention is to accomplish the foregoing by a system that utilizes a flexible web, or tape, as the record medium. Those and other objects have been achieved by the invention herein claimed.

The invention finds utility in a tape cassette that is operatively positionable in associated apparatus having rotatory drive means and a signal-communicating head. The cassette comprises a cylindrical housing having a circumferential outer wall with at least one passageway therein, the housing being adapted for rotation about a central axis. A tape storage means is disposed inside the housing, with tape extending therefrom through the passageway, around the outer wall, and then back inside the housing. Means cooperable with the apparatus drive means is provided for imparting rotation thereform to the housing about its central axis, so as to move both the wall and the tape extending therearound together relative to the apparatus signal-communicating head.

The invention finds utility also in apparatus for recording/reading information signals on tape supported by a cassette, the cassette including a rotatable cylindrical housing having a circumferential outer wall with at least one passageway therein and tape storage means inside the housing having a spool centrally mounted therein for rotation relative to the housing, with tape extending from the storage means through the passageway, helically around the outer wall, and back inside the housing. The apparatus comprises means for supporting the cassette in an operative position and rotatory drive means, couplable with the cassette when in said position, for rotating the cassette housing and the tape storage means together relative to the supporting means. A signal-communicating head is mounted in the apparatus for alignment with a portion of the tape extending helically around the housing outer wall of the cassette when in said position, for recording/reading information signals along a slant track on the tape as the drive means rotates the housing and the storage means together relative to the supporting means. Tape advancing means, couplable with the tape storage means of the cassette when in said position, may be provided for rotating the storage means spool relative to the cassette housing, so as to advance the tape extending helically around the housing outer wall relative to the outer wall, or means may be provided for moving the head transversely of the tape, so as to record/read along another slant track.

As particularly described and illustrated herein, the invention is embodied in a system for recording, storing, and reading information signals on an elongate flexible web. The system comprises a cylinder having an outer wall with at least one opening therein and adapted for rotation about a central axis. Web storage means disposed inside the cylinder includes a spool centrally mounted in the cylinder for rotation relative thereto, with the web extending from the storage means through the opening, around the outer wall, and back inside the cylinder. A signal-communicating head located outside the cylinder is aligned with a portion of the web extending around the outer wall. Rotary drive means is provided for rotating the cylinder and the storage means together so as to move both the outer wall and the web extending therearound relative to the head; and web advancing means is provided for rotating the storage means spool relative to the cylinder so as to move the web extending around the outer wall relative to both the wall and the head.

The invention, and its objects and advantages, will become more apparent in the detailed description of the preferred and alternative embodiments presented below.

BRIEF DESCRIPTION OF THE DRAWINGS

In the detailed description of the preferred and alternative embodiments of the invention presented below, reference is made to the accompanying drawings, wherein like reference numerals denote like elements and wherein.

DESCRIPTION OF THE PREFERRED AND ALTERNATIVE EMBODIMENTS

Because certain parts of systems for recording, storing, and reading information signals on a record medium are well known, the following description is directed in particular to those elements forming, cooperating directly with, or relating to, the present invention. Elements not specifically shown or described herein are selectable from those known in the relevant art.

In general, the tape cassette described and illustrated herein may be used with any tape recorder/reader, be it magnetic, optical, or some other type, whose track width is less than the tape width. With such a recorder/reader, this cassette obviates the commonly used serpentine method of running tape from end to end (streaming). The basic features of this cassette and cooperating recorder/reader apparatus are depicted schematically in FIG. 1.

Figure 2:
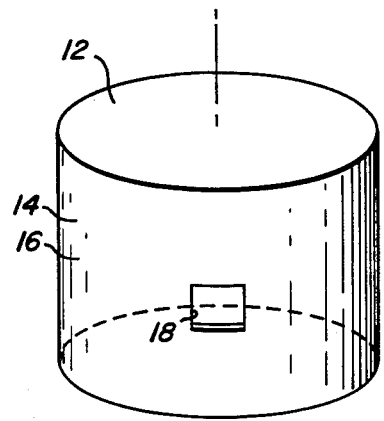
FIGS. 2 and 3 are schematic perspective views illustrating alternative tape passageways that may be incorporated in the cassestte of FIG. 1.
Figure 3:
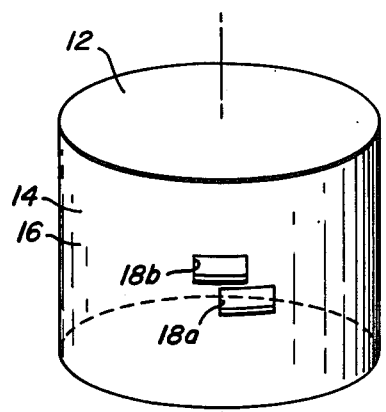

As there shown, the cassette 10 comprises a cylindrical housing 12 having a circumferential outer wall 14 with a radially outward-facing surface 16. Wall 14 is provided with tape passageway means, through which tape can pass from inside housing 12 to surface 16 and vice versa. As illustrated in FIGS. 2 and 3, such passageway means may comprise either a single opening 18, through which tape can pass both out of and back into the housing, or a plurality of openings such as 18a and 18b, through which tape can pass out of and back into the housing. Housing 12 is adapted for rotation about its central axis X.

Figure 1:
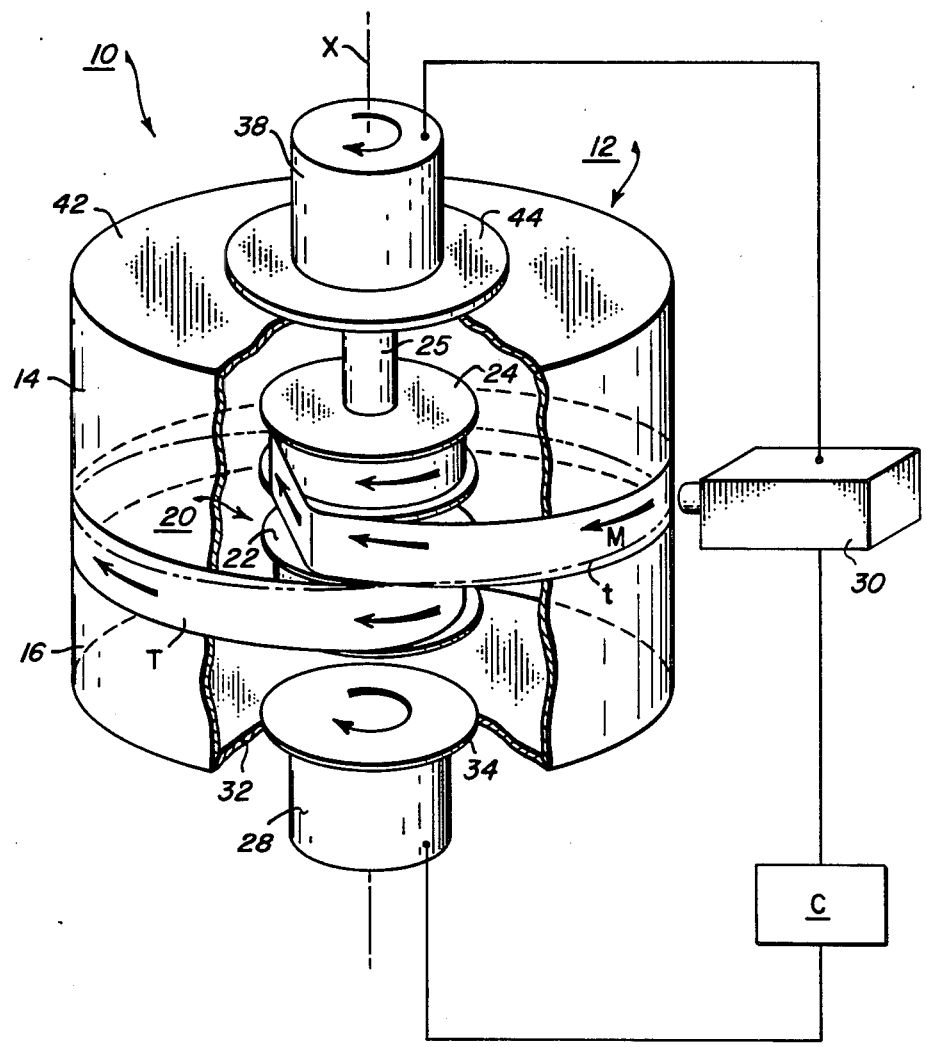
FIG. 1 is a schematic perspective view showing the principal features of a tape cassette and cooperating apparatus configured and arranged according to the preferred embodiment of this invention.
Figure 4:
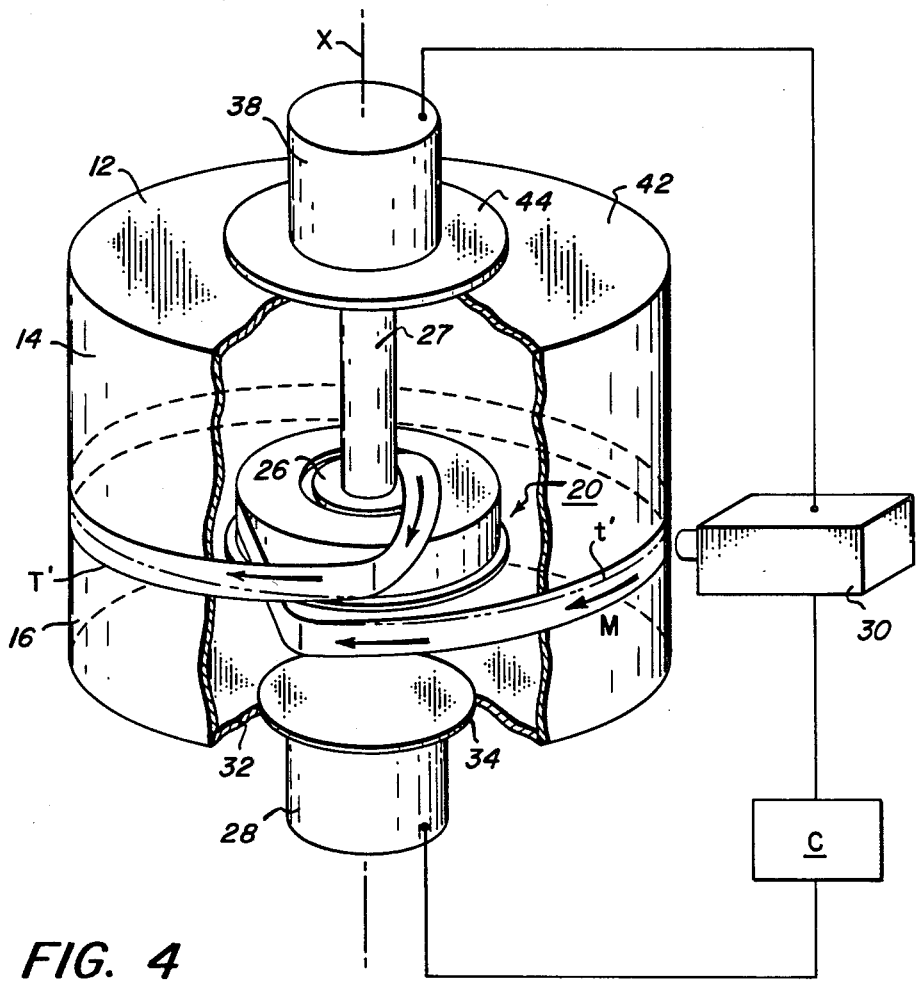
FIG. 4 is a schematic perspective view showing the cassette of FIG. 1 with an alternative tape storage means incorporated therein.

Disposed inside the housing is a tape storage means 20, which may comprise either an elongate length of tape T coupled (at or near its ends) to a pair of superposed rotatable spools 22 and 24 on a spindle 25, as shown in FIG. 1, or an endless loop of tape T' wound about a single rotatable spool 26 on a spindle 27, as depicted in FIG. 4. In either case, the rotatable spool(s) is(are) centrally mounted in housing 12 for rotation along with and relative to the housing, preferably but not necessarily about an axis substantially coincident with central axis X; and the tape extends from storage means 20 outwardly through the passageway means in wall 14, around outside surface 16 thereof, and then inwardly back through the passageway means to the storage means. Preferably the tape extending around surface 16 is wound helically therearound through at least one substantially complete turn, as illustrated in FIGS. 1, 4, 7, and 10-12. With particular reference to the storage means arrangement of FIG. 1, tape T extends from supply spool 22 outwardly through opening 18 (FIG. 2) or 18a (FIG. 3), helically upward around surface 16, and then inwardly back through opening 18 or 18b (FIG. 3) to take-up spool 24. In the arrangement of FIG. 4, tape T' extends from spool 26 outwardly through opening 18 or 18b, helically downward around surface 16, and then inwardly back through opening 18 or 18a to spool 26.

Cassette 10 is adapted for use in cooperative tape recorder/reader apparatus having rotatory drive means and a signal-communicating head. In FIGS. 1 and 4, the apparatus drive means and head are schematically depicted in the form of an electric motor 28 and a communicating head 30. When the cassette is operatively positioned in the apparatus, motor 28 is centrally disposed beneath bottom wall 32 of cassette housing 12 as shown. Centrally fixed to wall 32 is a circular plate 34, which is adapted to be drivably coupled to motor 28 so as to impart rotation therefrom to housing 12 about central axis X. As housing 12 thus rotates, the tape storage means 20 rotates along with it, so that both outer wall 14 and the tape extending therearound move together relative to head 30. With the arrangements depicted in FIGS. 1 and 4, head 30 is fixedly mounted in the apparatus adjacent to, and in signal-communicating alignment with, a portion of the tape extending around wall 14. As the tape thus moves in its forward direction M past head 30, the head records/reads information signals along a track on the tape. And since the tape extends helically around wall 14, the track is a "slant" track which, for each revolution of housing 12, extends diagonally from one longitudinal edge portion of the tape to the other over a longitudinal displacement equal to the circumferential length L of underlying surface 16. One such track $\underline{t}$ is shown in broken lines on the tape T depicted in FIG. 1, and one such track $\underline{t'}$ is similarly shown on the tape T' in FIG. 4.

Figure 5:
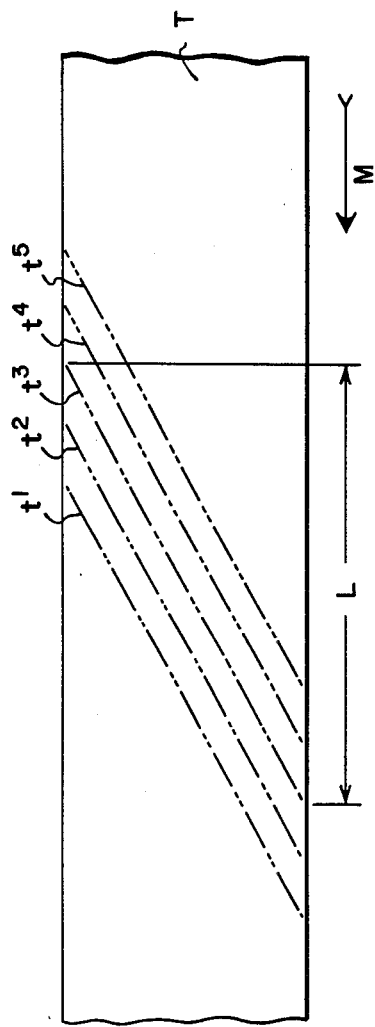
FIG. 5 is an enlarged elevational view showing a longitudinal section of the tape depicted in FIG. 1 with a succession of slant tracks thereon.

To permit continued recording/reading upon reaching the end of such a track, means are provided for advancing the tape longitudinally relative to surface 16 by an amount so determined that no part of the tape is either recorded/read on more than once or left blank. A continuation of the first track is thus effected in the form of an identical new track next to the first one. With each succeeding revolution of housing 12, the tape is again advanced by the same incremental amount, thereby affording a succession of parallel slant tracks. Such tracks are illustrated schematically in FIG. 5 by the broken lines $\underline{t^1}$, $\underline{t^2}$, $\underline{t^3}$, $\underline{t^4}$, and $\underline{t^5}$, each resulting from circumferential movement of surface 16 and the tape thereon through the circumferential distance L in the forward direction M.

In FIGS. 1 and 4, such tape advancing means is schematically depicted in the form of an electric motor 38 centrally disposed above top wall 42 of cassette housing 12. Centrally fixed to wall 42 is a circular plate 44, which has a central aperture therein (not shown) in which the spool spindle 25 (FIG. 1) or 27 (FIG. 4) is journaled for rotation relative to housing 12. The upper end of the spindle protrudes above plate 44 and is adapted to be drivably coupled to motor 38 so as to impart rotation therefrom to the operative storage means spool.

With the arrangement of FIG. 1, when tape T is to be advanced in its forward direction M for normal recording/reading, the operative spool is take-up spool 24; but when that direction is to be reversed for tape retrieval, motor 38 is reversed and the operative spool then is supply spool 22 (which then functions as a rewind spool). Suitable clutching means (not shown) are provided so that, when motor 38 is driving in its forward direction (clockwise as viewed in FIG. 1), spool 24 is engaged and thereby driven in the same direction, and spool 22 is not engaged but enabled to rotate freely on the spindle; and similarly, when motor 38 is driving in its reverse direction (counterclockwise as viewed in FIG. 1), spool 22 is engaged and thereby driven in that direction, and spool 24 is not engaged but enabled to rotate freely on the spindle. With the arrangement of FIG. 4, the operative spool is always spool 26, which is driven by motor 38 either in forward direction M for normal recording/reading or in the reverse direction for tape retrieval.

With either storage means arrangement, relative to central axis X the rotatable spool(s) may be at an angle that is less than 90°, and the passageway opening(s) may be at an angle that is greater than zero, in order to minimize any chance of tape binding. The spool angle is not critical, however, inasmuch as the tape may undergo some twisting between each spool and surface 16 without adverse consequences.

In order to control, effectively and efficiently, the various operations described, suitable control means C (shown schematically in FIGS. 1 and 4) is operatively associated with motor 28, head 30, and motor 38 so as to cause motor 38 to advance the tape relative to wall 14 by the aforementioned determined amount each time motor 28 has rotated housing 12 and storage means 20 together through substantially one revolution, whereby head 30 records/reads information signals along a succession of slant tracks on the tape as housing 12 and storage means 20 are rotated together through successive revolutions, said determined amount being such that no part of the tape is either recorded/read on more than once or left blank.

Alternatively, instead of so advancing the tape incrementally relative to wall 14 each time the housing and storage means have completed substantially one revolution (as just described), head 30 could be mounted for movement relative to wall 14 transversely of the tape, and then controlled to effect such transverse movement incrementally each time the housing and storage means have completed substantially one revolution, so as to record/read along a like succession of slant tracks as the housing and storage means complete successive revolutions.

Figure 6:
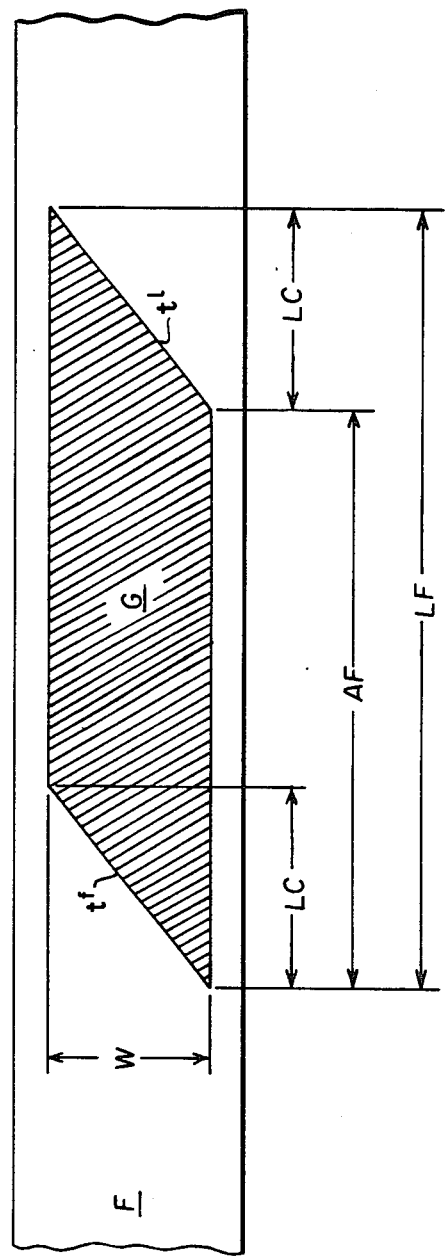
FIG. 6 is a schematic diagram showing an exemplary information-storage area on the tape depicted in FIGS. 1 and 4.

A significant advantage of this invention is the large data storage capacity it provides. For example, as illustrated schematically in FIG. 6, cassette 10 could be used as a 10-Gigabyte storage device. If an area of 2.52 $\mu m^2$ (1.8 $\mu m \times 1.4$ $\mu m$) is needed to store one bit, then a total area $G$ of 201,600 mm$^2$ is required for 10 Gigabytes. And if tape comprising 35 mm film $E$, with 30 mm of useful width $W$ for data storage, is used with a cassette housing that has an outside diameter of 250 mm (9.84 in.), and thus a circumference $LC$ of 785 mm (30.9 in.), then a length $LF$ equal to 7,505 mm (295.5 in., or 24.6 ft.) of such tape F is needed to store the 10 Gigabytes. Thus, to get from the first track $t^l$ to the last track $t^l$ of a 10-Gigabyte range would require a total tape advance $AF$ of 6,720 mm (264.6 in.). If the tape moves at a velocity of 2,540 mm/sec. (100 in./sec.) with negligible start/stop time, then with the endless-loop arrangement of FIG. 4 the average seek time for all 10 Gigabytes of data would be 1.32 sec.

Figure 7:
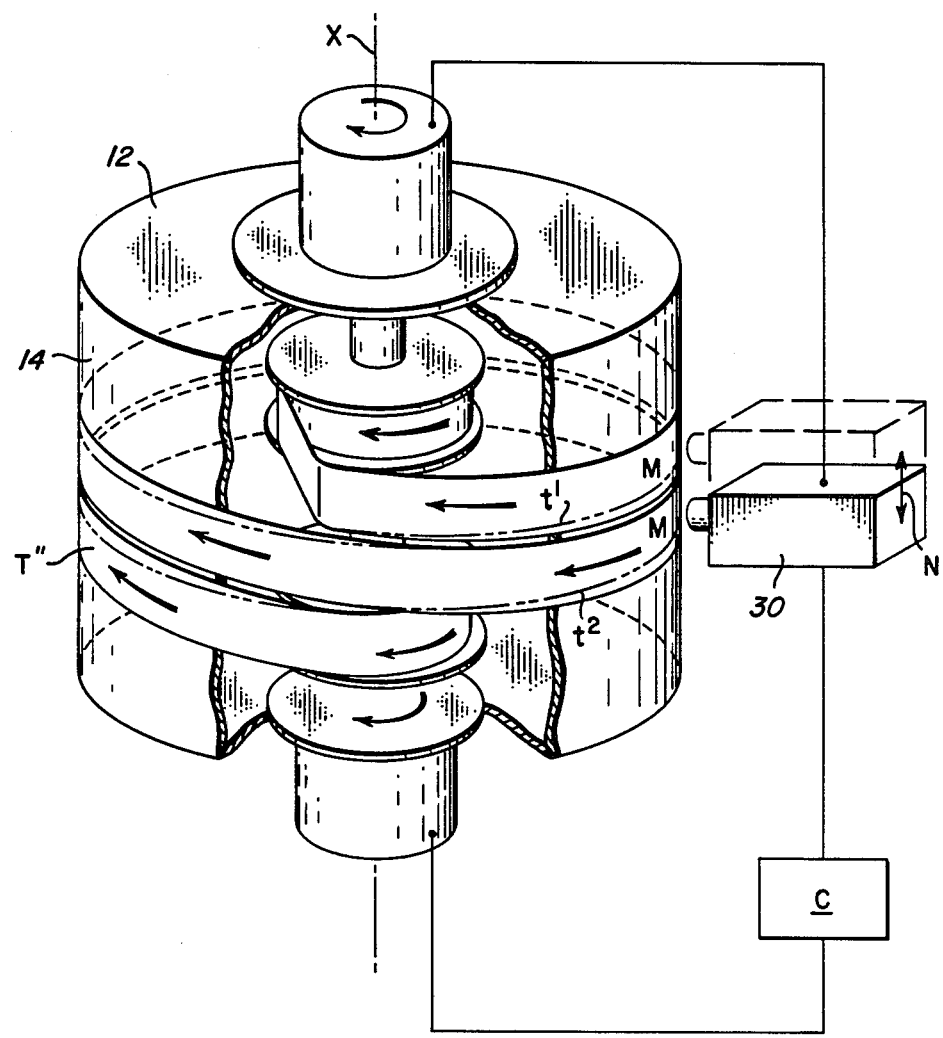
FIGS. 7-12 are schematic perspective views showing useful modifications of the cassette and apparatus depicted in FIGS. 1 and 4.

An especially useful arrangement of the cassette and cooperating apparatus of this invention may be had when the tape, instead of extending around the housing outer wall only once as shown in FIG. 1, extends helically therearound twice as illustrated in FIG. 7. In this case, the signal-communicating head 30, instead of being fixedly mounted in the apparatus as in FIG. 1, is movably mounted near the outer wall for movement in either direction $N$, transverse to the tape $T$, over a range of at least one tape-width, as indicated by the head's moved position shown in broken lines. This arrangement thus provides the same fast access rate to both such turns of tape wound around the housing (e.g., to tracks $t^1$ and $t^2$ thereon shown in FIG. 7) that a disk typically provides; and it also offers the extraordinarily large storage capacity afforded by all of the tape wound about the spool(s) inside the housing. For example, if the tape comprises 35 mm film with 30 mm of recorded axis bit packing density of $5E^8$ bits/in.$^2$, or 1.29 $\mu m^2$/bit, and if the cassette housing has an outside diameter of 250 mm (9.84 in.), and thus a circumference of 785 mm (30.9 in.), then, by keeping the tape stationary relative to the housing and moving only the head as described above, one has access to 18.3 Gigabytes in the same access time as with a disk; and, by moving the tape relative to the housing as described earlier, one has access to $10^{13}$ bits. This arrangement thus offers the combined advantages of a very fast access disk and a relatively slow access mass storage device.

Figure 8:
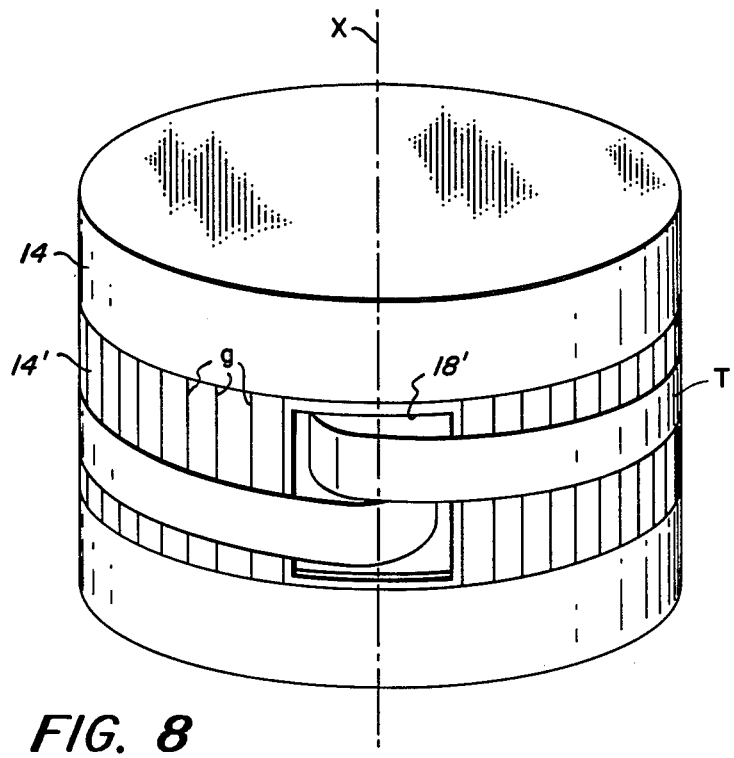
Figure 9:
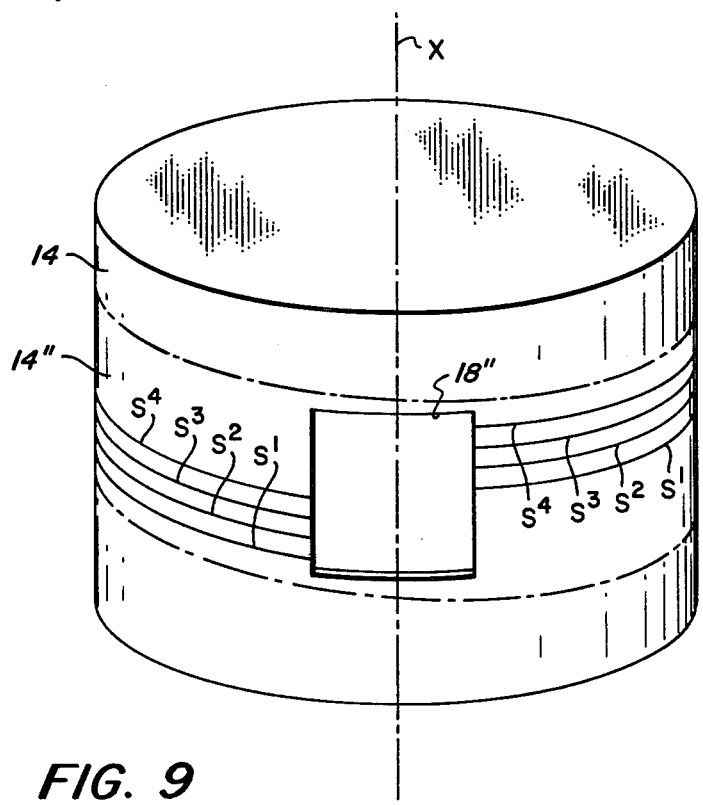

Further modifications can be made to enhance the operational effectiveness of this invention. For example, as depicted in FIG. 8, to facilitate moving the tape around the cassette housing, the portion $14'$ of housing outer wall 14 on which tape T is wound from and back to opening $18'$ can be made separately rotatable with the tape, i.e., rotatable relative to the remainder of wall 14, about central axis X. On that rotatable portion $14'$, the only sliding motion of tape T would be in the directions of axis X. To facilitate such motion, portion $14'$ can be provided with a plurality of circumferentially spaced grooves g extending parallel with the central axis. Alternatively, instead of making the tape-bearing portion of wall 14 separately rotatable as just described, that portion, delineated by circumferential broken lines and designated $14''$ in FIG. 9, could simply be provided with a plurality of axially spaced slant grooves s ($s^1-s^4$ shown) extending from and back to opening $18''$ substantially parallel with the tape thereon, each such groove having a pitch of one tape-width per circumferential-length of the tape-bearing portion, to facilitate tape movement on that portion in both its circumferential and axial directions. With either arrangement, each groove g or s could suitably have a width and depth of about 1 to 2 mils (0.0254 to 0.0508 mm).

Figure 10:
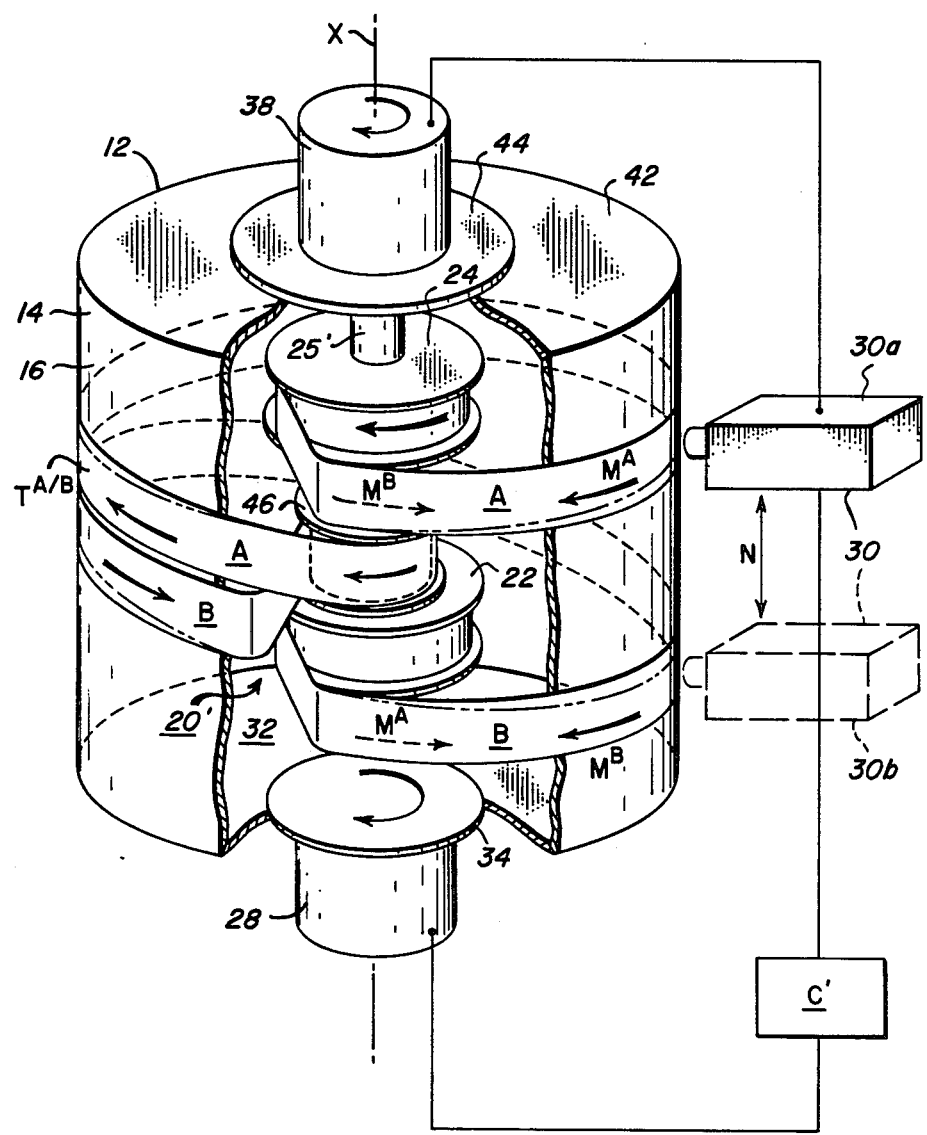

Another useful modification can be made, as illustrated in FIG. 10, by winding the tape $T^{A/B}$ helically around the cassette housing 12 through at least two turns but reversing the direction of the winding between those turns, so as to render both sides A and B of the tape usable for recording and reading.

In the arrangement of FIG. 10, an idler spool $46$ is mounted on spindle $25'$ axially between spools 22 and 24 so as to be freely rotatable relative to the spindle at all times.

Figure 11:
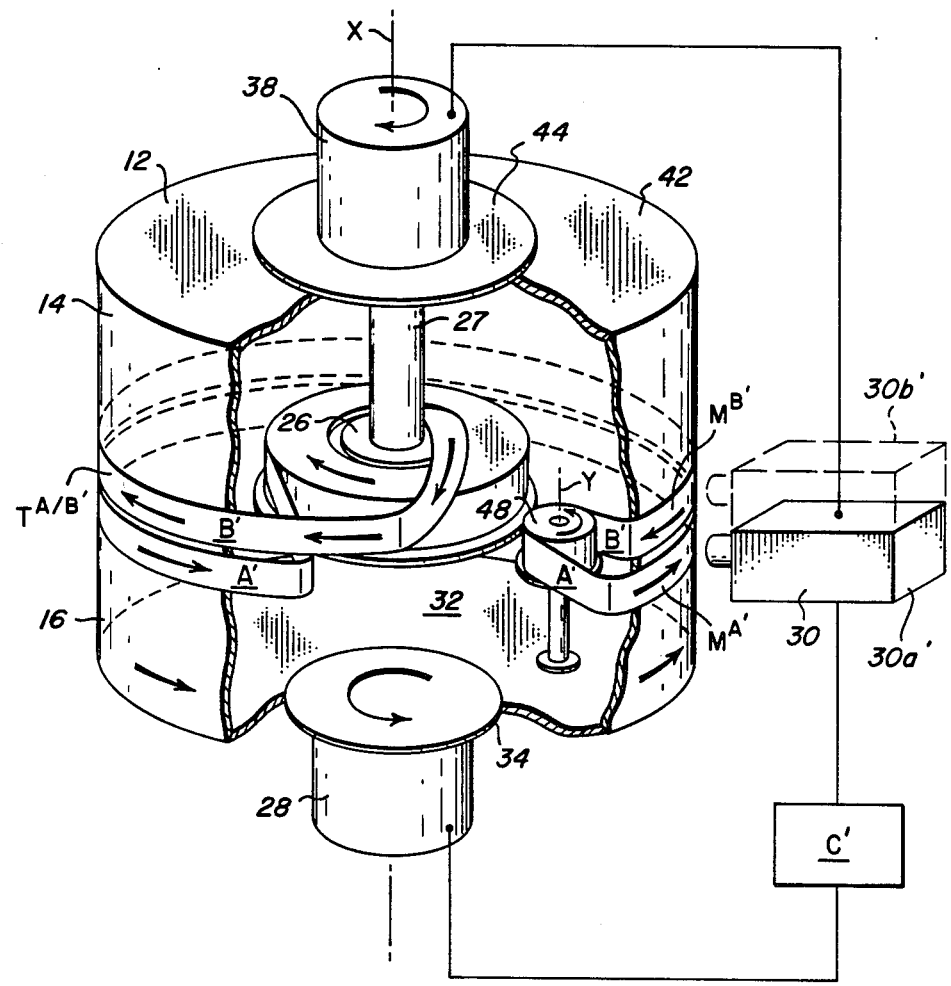

Alternatively, as depicted in FIG. 11, an idler spool $48$ can be rotatably mounted on a structural part of housing 12 (such as bottom wall 32, as shown, or wall 14) so as to revolve (along with wall 14) around central axis X but still be freely rotatable about its own axis Y. As shown in FIG. 11, this alternative is especially adaptable to use with the endless-tape arrangement of FIG. 4, whereby spool 48 can be conveniently located in the annular space radially between wall 14 and spool 26, and at substantially the same axial level as spool 26, so as to minimize the axial length of housing 12.

Referring back to FIG. 10, the tape $T^{A/B}$ therein extends from supply spool 22 at the bottom, outwardly through a suitable passageway or opening in wall 14, helically upward counterclockwise around surface 16, then inwardly back through the same or another opening in wall 14, to and clockwise around spool 46, then outward again through a suitable opening, helically upward clockwise around surface 16, and finally inward again through an opening to take-up spool 24. As viewed from the top of FIG. 10, the tape is coiled counterclockwise around each of spools 22 and 24; and the direction of its helical upward winding around surface 16 is changed from counterclockwise at the bottom (where tape side B faces outward) to clockwise at the top (where tape side A faces outward) by its clockwise detour around spool 46 therebetween. One advantage of this arrangement is that, for normal recording/reading on either side A or side B, or for tape retrieval (rewinding), motors 28 and 38 need operate in only one direction, viz., clockwise as shown by the arrows on both motors.

In the FIG. 10 arrangement, when recording/reading is to occur on side A, head 30 is located adjacent thereto in its upper position 30a shown in solid lines; motor 28 rotates housing 12 and the tape together clockwise; and motor 38 (through suitable clutching means, not shown) is disengaged from supply spool 22 but drivingly engaged with take-up spool 24 so as to turn spool 24 clockwise and thereby advance the tape incrementally in direction $M^A$ relative to wall 14 as housing 12 completes each revolution.

Similarly, when recording/reading is to occur on side B, head 30 is shifted (by suitable means, not shown) to its lower position 30b shown in broken lines; motor 28, as before, rotates the housing and the tape together clockwise; and motor 38 (again through suitable clutching means, not shown) is disengaged from spool 24 but drivingly engaged with spool 22 (which not functions as a rewind spool) so as to turn spool 22 clockwise and thereby advance the tape incrementally in direction $M^B$ relative to wall 14 as the housing completes each revolution.

Suitable means (not shown) are provided for sensing completion of recording/reading on one side of the tape wound on one spool and for actuating the clutching means and head shifting means so as to engage the other spool and correspondingly position the head for recording/reading on the other side. To control the various functions involved, a suitable control means C' (shown schematically) is operatively associated with motor 28, head 30, and motor 38.

An alternative to the foregoing arrangement of FIG. 10 could be had by locating two separate heads in positions 30a and 30b and electrically switching from one head to the other, instead of mechanically shifting a single head from one position to the other, and by modifying the control means accordingly. With two heads, recording/reading on the two tape sides could occur sequentially, as described above, or it could occur simultaneously, in which case there would be no switching between the heads, and only one spool need be driven for all recording/reading on both tape sides, the other spool being driven only when necessary for tape retrieval.

Referring back to the arrangement of FIG. 11, tape $T^{A/B'}$ therein extends from above spool 26 as shown, outwardly through a suitable opening in wall 14, helically downward clockwise around surface 16, then inwardly through the same or another opening in the wall, to and counterclockwise around spool 48, then outwardly again through an opening, helically downward counterclockwise around surface 16, and finally inward again onto spool 26. Here the tape is coiled clockwise around spool 26; and the direction of its helical downward winding around surface 16 is changed from clockwise through its upper turn (where tape side B' faces outward) to counterclockwise through its lower turn (where tape side A' faces outward) by its counterclockwise detour around spool 48.

In the FIG. 11 arrangement, when recording/reading is to occur on tape side A', head 30 is located in its lower position 30a' shown in solid lines; motor 28 rotates housing 12 and the tape together counterclockwise; and motor 38 turns spool 26 clockwise and thereby advances the tape's lower turn incrementally counterclockwise, in direction $M^{A'}$, relative to wall 14 as housing 12 completes each revoluton. And when recording/reading is to occur on tape side B', head 30 is shifted to its upper position 30b' shown in broken lines; motor 28, as before, rotates the housing and the tape together counterclockwise; and motor 38, as before, turns spool 26 clockwise and thereby advances the tape's upper turn incrementally clockwise, in direction $M^{B'}$, relative to wall 14 as the housing completes each revolution. Here too, means (not shown) are provided for sensing completion of recording/reading on one side of the tape and for actuating the head shifting means to position the head for recording/reading on the other side. Alternatively, as with the FIG. 10 arrangement, two separate heads could be located respectively in positions 30a' and 30b', with means for electrically switching from one head to the other, instead of mechanically shifting the single head 30 between those positions. The two heads could thus record/read on the two tape sides either sequentially or simultaneously. As in FIG. 10, a suitable control means C' is operatively associated with the motors and head(s) to control the various functions involved.

Figure 12:
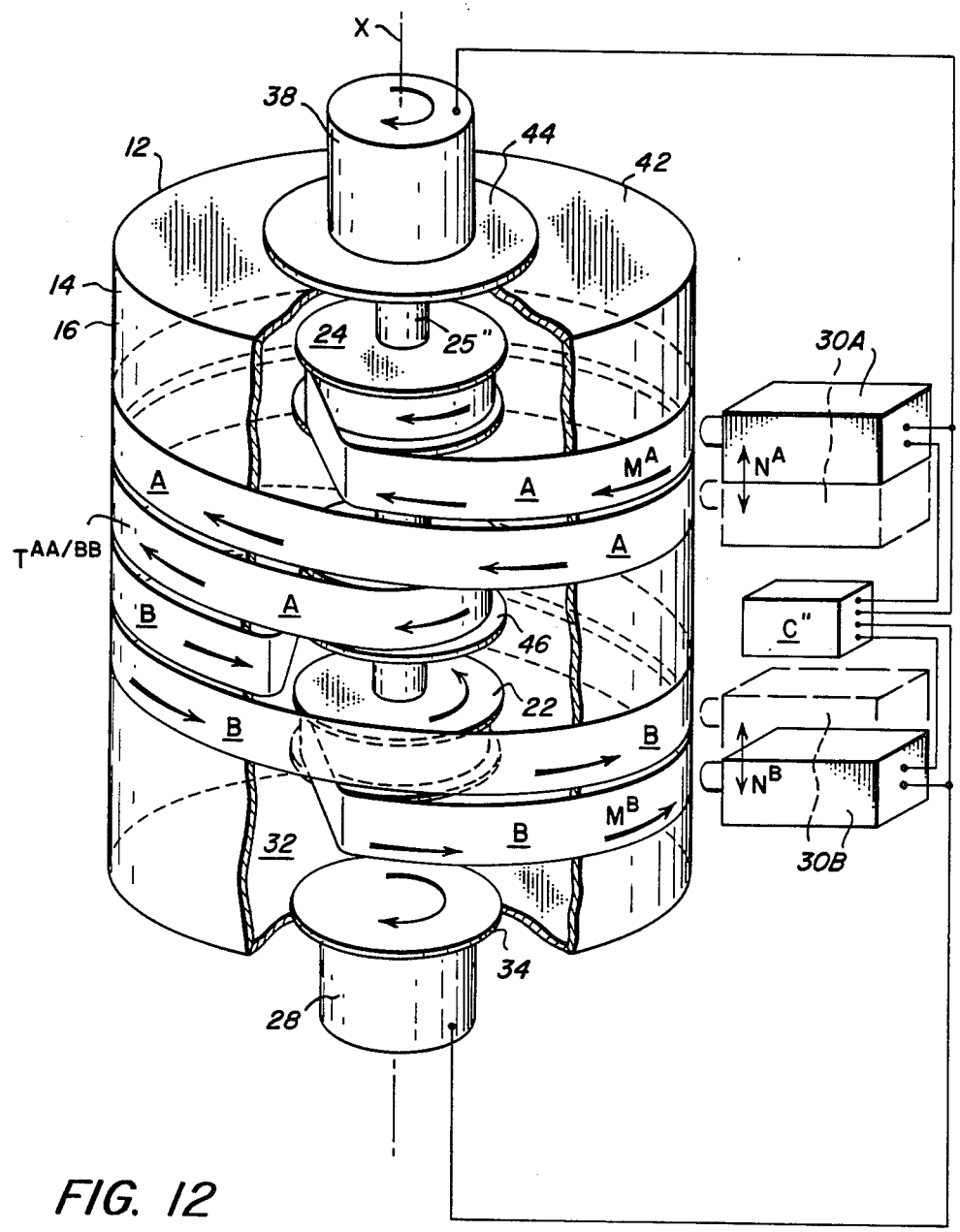

It is possible, of course, to combine other features of the various arrangements described. For example, FIG. 12 illustrates a highly useful combination of certain of the features heretofore described with reference to FIGS. 1, 7, and 10. This combination comprises, in addition to the basic features of FIG. 1, the described arrangement of FIG. 10 that utilizes two separate heads, for sequentially or simultaneously recording/reading on both sides of the tape, together with the described arrangement of FIG. 7 that provides two helical turns of the tape for each tape side. It will be seen that the two heads 30A and 30B are respectively disposed in signal-communicating relationship with the two sides A and B of tape $T^{AA/BB}$, and that those heads are transversely movable in directions $N^A$ and $N^B$ (as indicated by the moved positions thereof shown in broken lines) to provide the quick scanning and fast access rates discussed above with reference to FIG. 7. In this case, a suitable control means C" is schematically shown connected to both heads and both motors in order to control the various modes of operation attainable. This arrangement thus offers the combined advantages of fast access to, and mass storage on, both sides of the tape, along with flexibility in recording, reading, and/or scanning on each side either sequentially or simultaneously.

It will now be appreciated from all of the above that a system comprising the cassette and cooperating apparatus of this invention achieves the aforementioned objects thereof and, in so doing, offers these advantages:

(1) The cassette can hold a very large quantity of data (e.g., more than $10^{13}$ bits).
(2) The system can provide very fast access (e.g., requiring less than 200 msec.) to a significant portion (e.g., 29 Gbits) of a very large total quantity (e.g., $10^{13}$ bits) of stored data.
(3) Double-sided tape may be used to increase data content.
(4) No movement of the signal-communicating head is necessary, although limited transverse movement may be desirable for faster access.
(5) Recording/reading diameter is always constant (not so with a disk).
(6) The cassette is compact (e.g., less than 12 inches (30.48 cm) in diameter and under 3 inches (7.62 cm) in height).
(7) The system is very power-efficient.
(8) There is no stopping and restarting of the tape because of data overruns (as there is in a streaming tape drive).
(9) There is no time when recording or reading must stop (as there is with streaming tape).

The invention has been described in detail with particular reference to the preferred and alternative embodiments thereof, but it will be understood that further variations and modifications can be effected within the spirit and scope of the invention.

What is claimed is:

1. A tape cassette operatively positionable in associated apparatus having rotatory drive means and a signal-communicating head, said cassette comprising:
   a cylindrical housing having a circumferential outer wall with tape passageway means therein, said housing being adapted for rotation about a central axis;
   tape storage means disposed inside said housing with tape extending therefrom through said passageway means, around said outer wall, and back inside said housing; and
   means adapted to be cooperable with the apparatus drive means for imparting rotation therefrom directly to said housing about said axis, thereby to move said wall and said tape extending therearound together relative to the apparatus signal-communicating head.

2. A tape cassette as claimed in claim 1 wherein said passageway means comprises an opening in said outer wall through which said tape passes both out of and back into said housing.

3. A tape cassette as claimed in claim 1 wherein said passageway means comprises a plurality of openings in said outer wall through which said tape passes out of and back into said housing.

4. A tape cassette as claimed in claim 1 wherein said tape storage means comprises an endless loop of tape wound on rotatable means centrally mounted in said housing for rotation relative thereto.

5. A tape cassette as claimed in claim 1 wherein said tape storage means comprises an elongate length of tape coupled to superposed rotatable means coaxially mounted in said housing for concentric rotation relative thereto.

6. A tape cassette as claimed in either claim 4 or claim 5 including spindle means centrally mounting said rotatable means for concentric rotation relative to said housing about said central axis.

7. A tape cassette as claimed in either claim 4 or claim 5 wherein said tape extending around said outer wall is wound helically therearound through at least one substantially complete turn.

8. A tape casette as claimed in claim 7 including means adapted to be cooperable with the apparatus for imparting separate rotation to said rotatable means relative to said housing, thereby to move said tape relative to said wall.

9. A tape cassette as claimed in claim 8 wherein, when said cassette is operatively positioned in the apparatus, said means for imparting separate rotation to said rotatable means is operative to move said tape relative to said wall by a determined amount when said means for imparting rotation directly to said housing has moved said wall and said tape together through substantially one revolution.

10. A tape cassette as claimed in claim 9 wherein, when said cassette is operatively positioned in the apparatus, a portion of said tape helically wound around said wall is disposed in signal-communicating relation to the apparatus head, whereby the head communicates information signals along a separate slant track on said tape as said wall and said tape move through each succeeding revolution.

11. A tape cassette as claimed in claim 10 wherein said tape helically wound around said outer wall has first and second sides and includes at least first and second substantially complete turns thereof around said wall; wherein said first turn extends around said wall in a first direction, with said first side facing outward; wherein said cassette includes tape direction reversing means, disposed inside said housing to receive said tape from said wall, for reversing said first direction between said first and second turns; and wherein said second turn thereupon extends around said wall in a second direction opposite to said first direction, with said second side facing outward; whereby each of said sides is oriented on said wall to confront the apparatus head for signal communication therewith.

12. A tape cassette as claimed in claim 11 wherein said reversing means is centrally mounted in said housing coaxially with said rotatable means.

13. A tape cassette as claimed in claim 12 wherein said reversing means and said rotatable means are each rotatably mounted for rotation about an axis substantially coincident with said central axis.

14. A tape cassette as claimed in claim 11 wherein said reversing means is eccentrically mounted in said housing to revolve with said wall around said central axis.

15. A tape cassette as claimed in claim 14 wherein said reversing means is rotatably mounted on a portion of said housing for rotation about an axis eccentric to said central axis.

16. A tape cassette as claimed in claim 10 wherein said wall includes means for facilitating movement of said tape thereon.

17. A tape cassette as claimed in claim 16 wherein said means for facilitating movement of said tape includes a tape-bearing portion of said wall that is separately rotatable, together with said tape thereon, relative to non-tape-bearing portions of said wall.

18. A tape cassette as claimed in claim 17 wherein said tape-bearing portion of said wall includes a plurality of circumferentially spaced grooves substantially parallel with said axis.

19. A tape cassette as claimed in claim 16 wherein said means for facilitating movement of said tape includes a tape-bearing portion of said wall having a plurality of axially spaced grooves substantially parallel with said tape thereon.

20. A tape cassette as claimed in claim 19 wherein said grooves have a pitch of substantially one tape-width per circumferential-length of said tape-bearing portion.

21. Apparatus for recording/reading information signals on tape supported by an associated cassette, the cassette including a rotatable cylindrical housing having a circumferential outer wall with passageway means therein, the cassette further including tape storage means inside the housing having a spool centrally mounted therein for rotation relative to the housing, with tape extending from the storage means through the passageway means, helically around the outer wall, and back inside the housing, said apparatus comprising:
   means adapted for supporting the cassette in an operative position;
   rotatory drive means, adapted to be couplable with the housing of the cassette when in said operative position, for rotating the housing and the tape storage means together relative to said supporting means;
   a signal-communicating head, mounted in said apparatus and adapted for alignment with a portion of the tape extending helically around the housing outer wall of the cassette when in said operative position, for recording/reading information signals along a slant track on the tape as said drive means rotates the cassette housing and the tape storage means together relative to said supporting means; and
   tape advancing means, adapted to be couplable with the tape storage means of the cassette when in said operative position, for separately rotating the storage means spool relative to the cassette housing, thereby to advance the tape extending helically around the housing outer wall relative to the outer wall.

22. Apparatus as claimed in claim 21 wherein said signal-communicating head is fixedly mounted, relative to said supporting means, near said portion of the tape extending helically around the housing outer wall.

23. Apparatus as claimed in claim 21 wherein said signal-communicating head is movably mounted near the housing outer wall for movement in a direction transverse to the tape extending helically therearound.

24. Apparatus as claimed in claim 21 including control means, operatively associated with said drive means and said advancing means, for causing said advancing means to advance the tape relative to the outer wall by a determined amount each time said drive means has rotated the housing and the storage means together through substantially one revolution, whereby said head records/reads information signals along a succession of slant tracks on the tape as the housing and the storage means are rotated together through successive revolutions.

25. Apparatus as claimed in claim 21 wherein said drive means and said advancing means include respective rotation imparting members rotatable about a common axis and adapted to be couplable with the cassette housing and the tape storage means respectively.

26. Apparatus as claimed in claim 25 wherein said rotation imparting members of said drive means and said advancing means are mounted adjacent to axially opposite ends of the cassette and adapted for coupling with the cassette housing and the storage means spool respectively.

27. A system for recording, storing, and reading information signals on an elongate flexible web, said system comprising:
   a cylinder having an outer wall with an opening therein, said cylinder being adatped for rotation about a central axis;
   web storage means disposed inside said cylinder and including a spool centrally mounted in said cylinder for rotation relative thereto, said web extending from said storage means through said opening, around said outer wall, and back inside said cylinder;
   a signal-communicating head disposed outside said cylinder and aligned with a portion of said web extending around said outer wall;
   rotary drive means couplable with said cylinder for rotating said cylinder and said storage means together so as to move both said outer wall and said web extending therearound relative to said head; and
   web advancing means couplable with said storage means for separately rotating said storage means spool relative to said cylinder so as to move said web extending around said outer wall relative to both said wall and said head.

28. A system as claimed in claim 27 wherein said outer wall includes means for facilitating movement of said web thereon.

29. A system as claimed in claim 27 wherein said web extending around said outer wall is wound helically therearound through at least one substantially complete turn.

30. A system as claimed in claim 29 wherein said head is fixedly disposed near said portion of said web extending around said outer wall.

31. A system as claimed in claim 29 wherein said head is movably disposed near said outer wall for movement in a direction transverse to said web extending therearound.

32. A system as claimed in claim 29 including control means, operatively associated with said drive means and said advancing means, for causing said advancing means to move said web relative to said wall by a determined amount each time said drive means has rotated said cylinder and said storage means together through substantially one revolution, whereby said head communicates information signals along a succession of slant tracks on said web as said cylinder and said storage means are rotated together through successive revolutions.

33. A system as claimed in claim 32 wherein said web helically wound around said outer wall has first and second sides and includes at least first and second substantially complete turns thereof around said wall; wherein said first turn extends around said wall in a first direction, with said first side facing outward; wherein said system includes web direction reversing means, disposed inside said cylinder to receive said web from said wall, for reversing said first direction between said first and second turns; and wherein said second turn extends around said wall in a second direction opposite to said first direction, with said second side facing outward; whereby each of said sides is outwardly oriented to confront said head for signal communication therewith.

34. A system as claimed in claim 33 wherein said reversing means is centrally mounted inside said cylinder in concentric relation to said central axis.

35. A system as claimed in claim 33 wherein said reversing means is eccentrically mounted inside said cylinder to move with said wall around said central axis.

36. A system as claimed in claim 33 wherein said head is movably mounted near said wall for movement from a first position in alignment with a portion of said first turn to a second position in alignment with a portion of said second turn, to communicate information signals on said first and second sides respectively.

37. A system as claimed in claim 33 wherein said head is mounted near said wall in alignment with a portion of said first turn, to communicate information signals on said first side; and wherein said system includes another signal-communicating head disposed outside said cylinder and aligned with a portion of said web extending around said outer wall, said other head being mounted near said wall in alignment with a portion of said second turn, to communicate information signals on said second side.

38. A system as claimed in claim 27 wherein said spool is mounted for rotation about said central axis.

39. A system as claimed in claim 38 wherein said drive means and said advancing means include respective rotation imparting members rotatable about said central axis and operatively disposed to rotate said cylinder and said storage means together and said spool relative to said cylinder respectively.

40. A system as claimed in claim 39 wherein said rotation imparting members of said drive means and said advancing means are operatively disposed adjacent to axially opposite ends of said cylinder so as to rotate said cylinder and said storage means together and said spool relative to said cylinder respectively.

* * * * *